United States Patent [19]
Rottmayr et al.

[11] 3,911,082
[45] Oct. 7, 1975

[54] PREVENTION OF RESIN FORMATION DURING ABSORPTION OF $CO_2$ AND/OR $H_2S$ FROM CRACKING GASES

[75] Inventors: Friedrich Rottmayr; Hans Reimann, both of Pullach (Isartal); Robert Schuster, Munich; Walter Wagner, Hohenschaftlarn; Hans Joachim Muller, Leverkusen, all of Germany

[73] Assignees: Linde Aktiengesellschaft; Erdolchemie Gesellschaft mit beschrankler Haftung, Cologne-Worringen, Germany

[22] Filed: Nov. 24, 1972

[21] Appl. No.: 309,264

Related U.S. Application Data
[62] Division of Ser. No. 36,082, May 11, 1970, abandoned.

[30] Foreign Application Priority Data
May 10, 1969 Germany.................. 1924052

[52] U.S. Cl.............. 423/226; 423/229; 423/232; 260/677 A

[51] Int. Cl........................................... B01d 53/34
[58] Field of Search........... 423/210, 220, 223, 226, 423/229, 232; 260/677 A

[56] References Cited
UNITED STATES PATENTS

| | | | |
|---|---|---|---|
| 2,497,954 | 2/1950 | McCulley.......................... | 423/229 |
| 3,660,016 | 5/1972 | John et al. ...................... | 423/226 |
| 3,696,162 | 10/1972 | Kniel.............................. | 423/229 X |

*Primary Examiner*—Earl C. Thomas
*Attorney, Agent, or Firm*—Millen, Raptes & White

[57] ABSTRACT

In a process comprising scrubbing in a column cracking gas containing $CO_2$, $H_2S$ and resin precursors with aqueous alkaline scrubbing solution to absorb $CO_2$ and $H_2S$ and thermally regenerating resultant loaded aqueous solution, the improvement comprising separating resin precursors from the aqueous solution prior to or during the regeneration of said solution. Settling, stripping, and solvent extraction techniques are employed.

9 Claims, 6 Drawing Figures

PREVENTION OF RESIN FORMATION DURING ABSORPTION OF $CO_2$ AND/OR $H_2S$ FROM CRACKING GASES

This is a division, of application Ser. No. 36,082, filed May 11, 1970 and now abandoned.

BACKGROUND OF THE INVENTION

This invention relates to the separation of gases, and in particular to a system for the removal of $CO_2$ and/or $H_2S$ from cracking gases by absorption with thermally regenerable aqueous alkaline solutions, and especially to systems for the reduction of resin accumulation during the regenerating step.

Gases produced by the partial combustion of hydrocarbons or by the pyrolysis thereof in flame gas or in superheated steam contain, depending on the selection of the particular cracking process, about 1–18% by volume of $CO_2$ and, depending on the sulfur content of the starting hydrocarbons, $H_2S$ on the order of several tenths of a percent. For example, in cracking by the indirect heating of the starting hydrocarbons, for example in tube heaters, only minor amounts of $CO_2$ are produced; therefore, the cracking gases obtained by this technique contain only at most about 1% by volume, generally no more than 0.3% by volume, of $CO_2$ and/or $H_2S$. The gases produced from cracking operations are defined as "cracking gases" for the purposes of this invention and for more information regarding their production, attention is invited to the following references which are incorporated by reference herein:

Cracking gases rich in $CO_2$ are obtained by the following cracking processes:

Partial oxidation: Chemie Ing. Techn. 20 (1954) 253; DT-PS 801 990; The Oil and Gas J. 1962 P.108/110; DT-AS 1 159 424; DT-AS 1 181 697.

High temperature Pyrolysis: Chem. Engng Feb. 1966 p.80/82

Wulff Process: Ind. & Eng. Chem. 45, 12 (1953) p.2596/2606; US-PS 2 830 677.

CVG-Process: Erdoel und Kohle 19, 2 (1966) p.108/112 further processes: Dt-AS 1 169 917; DT-AS 1 068 245.

Cracking gases with low $CO_2$-content are obtained by the processes described in Oil Gas J. 1956 Feb. 13, p.98/103; Apr. 2, p.99/103; May 14, p.149/55; June 25, p.92/97; July 30, p.171/74.

Erdoel und Kohle 14, 7 (1961) p.537/541.

The cracking gases with a high $CO_2$ content are first subjected, after cooling and the separation of carbon black, as well as heavy oil and light oil components, at ordinary or elevated pressure, to a rough scrubbing step with thermally regenerable aqueous alkaline scrubbing liquids, for example with solutions of alkanolamines, amino-acid salts, or potash, wherein the $CO_2$ and/or $H_2S$ content is reduced to values of below 1% by volume, in most cases to about 0.1 – 0.2% by volume. To attain the desired ppm-range in the fine scrubbing step, there is employed a solution of sodium hydroxide or potassium hydroxide. In the processing of cracking gases rich in olefins as produced in tube heaters, because of the low proportion of acidic components therein, the rough purification step can be omitted; and the fine purification is conducted in the same manner with sodium or potassium hydroxide solution.

Simultaneously with to the absorption of the acidic impurities, the aqueous alkaline solution also absorbs resin-forming substances contained in the gas, namely dienes, higher acetylenes, unsaturated polycyclic or heterocyclic compounds, and other polymerizable or condensable compounds, particularly sulfurcontaining compounds. These substances, hereinafter referred to as resin precursors, pass with the scrubbing liquid into the regenerating apparatus and react therein under the influence of the heat to form polymeric resinous products insoluble in the scrubbing liquid which are deposited in the regenerating column, in the heat exchanger connected thereto, and in the reboiler. These deposits can cause eventual fouling of all such apparatus, thereby involving not only replacement or cleaning of equipment, but also shutdown time, or even worse, the undetected inefficiency of the scrubbing step because of poor regeneration.

SUMMARY OF THE INVENTION

With reference to the above problem, a principal object of this invention is to provide a system for the removal of $CO_2$ and/or $H_2S$ from cracking gases by absorption with thermally regenerable aqueous alkaline solutions wherein the improvement resides in obviating or reducing the extent of the problem encountered because of resin formation.

Another object is to provide a process and associated apparatus for the removal of resin precursors in the scrubbing column by employing an entrainment baffle and a special settler zone within the scrubbing column.

Another object is to provide a process and associated apparatus for the removal of resin precursors by stripping the loaded aqueous solution with an inert gas in a separate stripping column.

Another object is to provide processes and associated apparatuses for the removal of resin precursors by the use of an inert organic solvent.

Another object is to provide processes and apparatus for the removal of resin precursors by the combinations of the above-described techniques.

Upon further study of the specification and appended claims, other objects and advantages of the present invention will become apparent.

In general, the principal object of this invention is attained by removing resin precursors from the cracking gas or aqueous solution during the step of thermally regenerating the loaded aqueous solution.

This invention is of particular importance when small amounts of acidic components are to be scrubbed out, i.e., during the further processing of gases as they are obtained, for example, by cracking naphtha in tube heaters, or by the moving bed process, content of $CO_2$ and $H_2S$ being ordinarily below 0.1%. The amount of scrubbing agent required for absorbing the acidic components is small in these cases. However, the $H_2S$ content of the gas is more dependent on the sulfur content of the starting hydrocarbon than on the type of cracking method. In other words, since it is always on the order of magnitude of a few tenths of one percent, independently of the $CO_2$ content of the gas, the sulfide content of the scrubbing solution is considerably higher in these cases where the cracking gas is poor in $CO_2$, as opposed to other cracking techniques involving high contents of $CO_2$ which require correspondingly large amounts of absorption liquid. It is known, however, that the rate of formation of resins in the scrubbing liquid is considerably enhanced by the presence of sulfide, i.e., polymerization and condensation products are formed considerably more slowly in sulfide-poor solutions than in solutions rich in sulfide. This explains why the danger of resin formation in the scrubbing cycle becomes particularly acute when only small amounts of scrubbing liquid are required, i.e. when the total amount of $CO_2$ and $H_2S$ does not exceed 1 preferably 0.3% by volume of the cracking gas.

This danger was removed heretofore, by washing a gas containing resin precursors and only minor amounts of acidic components with a solution of sodium or potassium hydroxide, and discarding the use scrubbing liquor rich in resin precursors. In this manner, the resin precursors and the secondary products thereof which were dissolved or dispersed in the sodium hydroxide solution could be discharged from the plant together with the used-up solution, without the occurrence of clogging, because the temperatures at which the polymerization and condensation reactions set in did not have to be exceeded during the course of this process. This process is, however, relatively expensive because of the cost of the scrubbing liquid, which is not thermally regenerable, and the necessity of the treating the consumed scrubbing liquid, i.e., in an expensive waste water treatment plant in order to form biologically inactive compounds before the solution is discharged to waste.

In contrast, the process of this invention permits the employment of thermally regenerable alkaline scrubbing liquids in the treatment of gases containing resin precursors without impairing the regeneration procedure. When processing gases having low contents of acidic components, there is the additional advantage that the expense of and the waste water treatment of sodium or potassium hydroxide solution is eliminated.

The absorbents employed are the conventional aqueous alkaline scrubbing liquids which can be thermally regenerated, for example solutions of potassium carbonate, alkanolamines, or amino-acid salts. It is preferred to use solutions of aminocarboxylic, aminosulfonic, or aminocarbonic acid salts, i.e., for example, p-otassium-N-methyl-α-aminopropionate, potassium-N-dimethylaminoacetate, or potassium-N-methyl-β-aminoethylsulfonate, dimethylammonium-N,N-dimethylcarbamate; since these compounds are efficient agents for the removal of $CO_2$ and/or $H_2S$, they exhibit poor dissolving power with respect to hydrocarbons; and they are readily regenerable.

One advantageous embodiment of the invention comprises removing condensate formed by cooling the overhead mixture of $CO_2$ and/or $H_2S$ steam, and volatile resin precursors withdrawn from the head of the regenerating column. The condensation is removed either completely or partially and is supplemented by fresh water. In this manner, the sulfur-containing and polymerizable hydrocarbons dissolved in the vapor condensate are not permitted to be recycled to the column in such quantities that would result in the deposition of resins therein.

Olefin-rich cracking gases produced for the purpose of producing ethylene and other unsaturated hydrocarbons are generally at the dew point in all the process steps following the cracking process. After the separation of the heavy oils and the oils in the boiling range of gasoline, the gas is compressed; as a result, hydrocarbons, in turn, condense in the coolers of the individual compressor stages. If this gas is exposed to slight cooling in the absorption column or on the way to this column, or if hydrocarbons are entrained from the last separator in the form of mists or droplets, a hydrocarbon condensate is again precipitated in the scrubbing column. The hydrocarbon condensate formed by scrubbing a cracking gas at approximately the dew point thereof acts as an organic solvent in extracting resin precursors. It was found that it is very detrimental if this sulfur-containing condensate, enriched in polymerizable substances, passes over into the regenerating column. Therefore, one embodiment of the invention provides that, during the scrubbing of raw gases which are approximately at the dew point, any hydrocarbon condensate which has entered the scrubbing column and which contains resin precursors dissolved therein, is practically completely separated from the aqueous absorbent prior to the regeneration.

In this connection, it is especially advantageous, though not essential, to conduct this separating step in the sump of the scrubbing column proper. In any case, whether it be in the sump or in an external settler, the residence time of the aqueous absorbent solution should be sufficient to permit substantially complete phase separation, e.g., at least 90%. This usually requires a residence time of about 10–30 minutes, and the separated phases are then continuously withdrawn.

Preferred apparatus for conducting the preceding described process comprises a vertically positioned partition located in the sump of the absorption column, which partition divides the sump into two chambers in such a manner that the cross section of one chamber is approximately 70–90% of the column cross section. The drain pipe extending from the lowermost plate, or from the collecting plate of the lowermost packing layer, terminates in the large chamber beneath the level of the aqueous absorption solution, the latter being kept at a constant level by means of a level or interface regulator. The smaller chamber is provided with an outlet conduit for the hydrocarbon phase containing the resin precursors, and the larger chamber is provided with an outlet leading to the regenerating column for the aqueous phase.

A considerable percentage of the resin precursors dissolved in the sump of the scrubbing column are still in the lowmolecular weight condition and thus volatile. In a further embodiment of the invention, these volatile resin precursors are stripped from the loaded aqueous alkaline solution withdrawn from the absorption column. This is done by contacting the loaded aqueous solution with a gas or gaseous mixture at room temperature or moderately elevated temperature, e.g., not higher than 50° C. In this manner, the volatile resin precursors are removed from the solution before it enters the warm parts of the regenerating system. Stripping gases which can be employed in this connection are gases obtained in the plant proper, for example methane, nitrogen, hydrogen or residual gases.

Another embodiment of this invention comprises subjecting the loaded aqueous alkaline solution, after withdrawal from the absorption column, to a liquid-liquid extraction with an organic solvent which is substantially immiscible with water. The solvent enriched in resins and resin precursors is separated continuously or discontinuously and replenished by fresh solvent. The discharged portion of the solvent can be subjected to a solvent recovery treatment, for example by distillation, and the thus-recovered solvent can be recycled to the solvent cycle.

This solvent extraction technique is especially applicable when hydrocarbon condensate forms in the scrubbing column, said condensate containing dissolved resin precursors. Instead of, or in conjunction with phase separation by settling, residual condensate and loaded aqueous alkaline scrubbing solution can be subjected to solvent extraction, and then the resultant scrubbing solution freed of resin precursors and resins is passed to the regenerating system.

Another embodiment of this invention comprises conducting the regeneration in the presence of an organic solvent substantially immiscible with water. In one aspect of the embodiment, the organic solvent and the aqueous alkaline absorbent are passed through the scrubbing and regenerating columns as a dispersion. A partial stream of the dispersion is withdrawn, the aqueous solution is separated from the organic solvent enriched in the resins and resin precursors, and recycled into the cycle; the contaminated organic solvent is replaced by pure organic solvent. To prevent the separation of the two phases in the sump of the scrubbing column, it is preferred to introduce a partial stream of the raw gas into the sump liquid of the absorption column beneath the liquid level. In the regenerating column, steam is blown into the sump liquid for the same purpose.

In another aspect of regenerating in the presence of organic solvent, the regenerated aqueous absorbent is separated from the lighter hydrocarbon phase containing the resin-forming substances in the sump of the regenerating column. The apparatus for conducting this process comprises a drain or dip pipe from the lowermost plate of the column terminating beneath the level of the aqueous solution; the outlet for the aqueous solution to the pump is disposed lower than the end of the dip pipe.

As organic solvents substantially immiscible with water, there are preferably employed aromatic hydrocarbons or mixtures thereof, fractions rich in aromatics, or chlorinated hydrocarbons, specific examples including, but not limited to benzene, toluene, xylene, $CHCl_3$, $CCl_4$, $C_2H_2Cl_4$, $CH_3-CHCl-CH_3$
$C_6H_5Cl$
$Cl_2C=CHCl$, $Cl_2C=CCl_2$ The quantitative ratio of aqueous to non-aqueous phases can vary within wide limits. Most advantageous is a ratio from about 50:1 to 10:1 (volume/volume).

With respect to the advantages derived from the use of solutions of amino-acid salts as absorbents for $CO_2$ and/or $H_2S$, it should be noted in conjunction with the solvent extraction of the resin precursors, that amino-acid salts, in contrast to alkanolamines, are insoluble in the liquid hydrocarbons or organic solvents serving as the extraction agents.

Generally speaking, flow rates, concentrations, equipment sizes, and other process variables are dependent on the analysis of the raw cracking gas and the desired purity specifications. To achieve the optimum design or best mode in a given process, reference is directed to the chemical engineering literature, for example, Perry's Chemical Engineering Handbook, Fourth Edition, McGraw-Hill, Sections 14, 18, and 21 (p. 10), and the references cited therein.

The preferred technique for carrying out the invention is shown in FIG. 4. If the resin precursors are not removed to the desired extent by the liquid-liquid extraction described in connection with FIG. 4, that is if the regenerating column has to be cleaned too often, say every 3 to 4 months, in addition to the process according to FIG. 4 there will be formed a hydrocarbon condensate during the scrubbing operation as described in connection with FIG. 2. If the described combination of processes still fails to completely remove the resin precursors, in addition thereto the process of FIG. 1 will be applied, that is the overhead stream of the regenerating column will be condensed and the condensate at least partially passed to waste.

BRIEF DESCRIPTION OF THE FIGURES

Referring to the annexed drawings, wherein like reference characters refer to like or corresponding parts in the several figures.

DETAILED DESCRIPTION OF THE DEPICTED PREFERRED EMBODIMENTS

Figure 1:
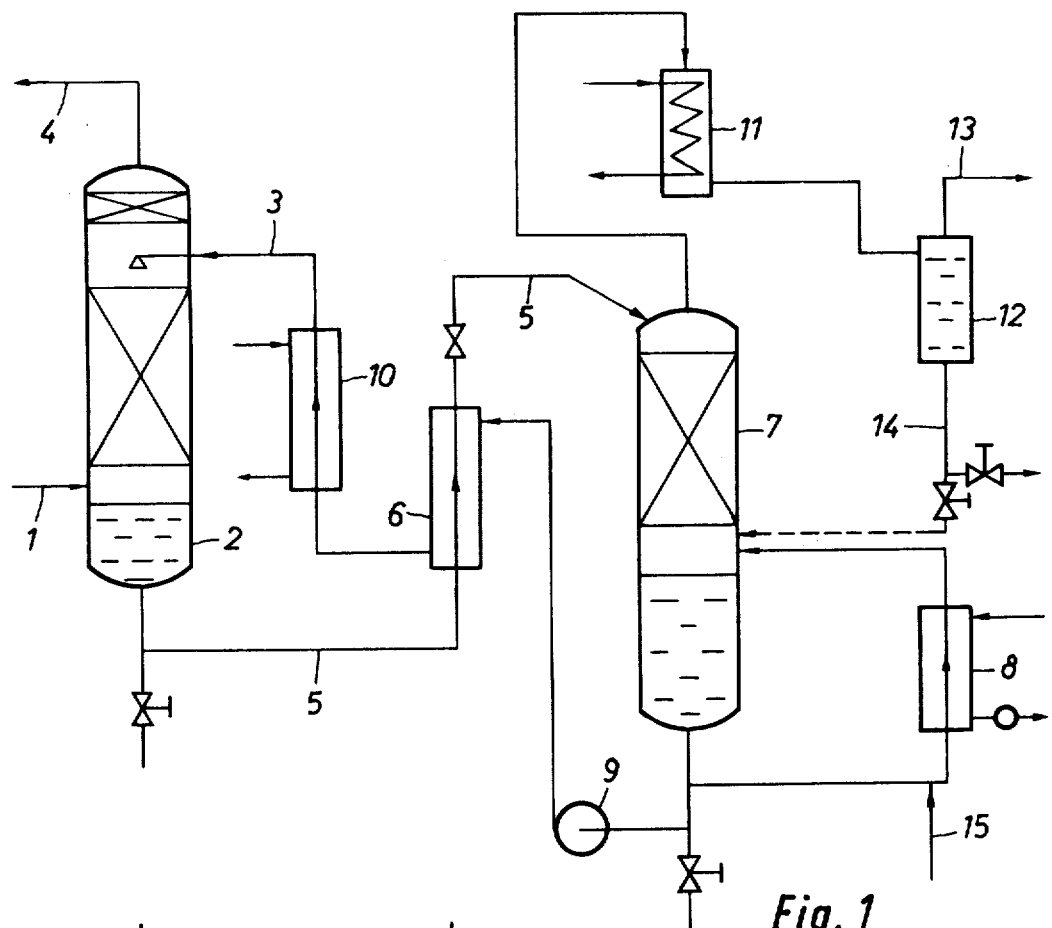
FIG. 1 is a schematic view of an absorption-regenerator combination wherein desorbed solute gas leaving the regenerator is cooled to form a condensate containing resin precursors, said condensate being only partially recycled to the regenerating column, if at all.

Referring to FIG. 1, cracking gas is introduced through conduit 1 into the scrubbing tower 2 equipped with means for facilitating mass transfer such as packing. In the tower, the gas is freed of $CO_2$ and/or $H_2S$ means of a solution of amino-acid salts introduced through conduit 3, and is then discharged from the scrubbing tower via conduit 4. The scrubbing liquid, loaded with dissolved gaseous acidic and resin-forming components passes, via conduit 5 and the heat exchanger 6, to the head of the regenerating column 7. At this point, the $CO_2$ and/or $H_2S$, as well as volatile resin precursors are desorbed from the downwardly flowing liquid by means of steam produced in the reboiler 8. Resultant hot regenerated scrubbing liquid having a temperature of about 110° C. is conducted by means of pump 9, through said heat exchanger 6 and a water cooled heat exchanger 10, and again introduced to the head of the absorption column 2.

The solute gaseous mixture withdrawn from the head of the column 7 contains steam, $CO_2$ and/or $H_2S$, and resin precursors. The latter are condensed in the water cooled heat exchanger 11, together with the steam, and separated from $H_2S$ and/or $CO_2$ in the separator 12. The gaseous $H_2S$ and/or $CO_2$ are withdrawn from the plant via conduit 13 at a temperature of about 30° C. At least part, preferably mostly, if not entirely of the condensate containing condensed water and resin precursors is discharged through conduit 14. Makeup steam corresponding to the quantity of discarded condensate is fed to the sump liquid via conduit 15. Any remaining condensate passes into the sump of the regenerating column 7, as indicated by dashed lines in the figure.

A preferred technique for avoiding difficulties caused by resin precursors in the reboiler resides in the use of two reversible interchangeable reboilers in the sump of the regenerating column; the idle off-stream exchanger can then be cleaned without interrupting the operation. Heat exchanger 6 can also be provided with a twin for the same purpose.

Figure 2:
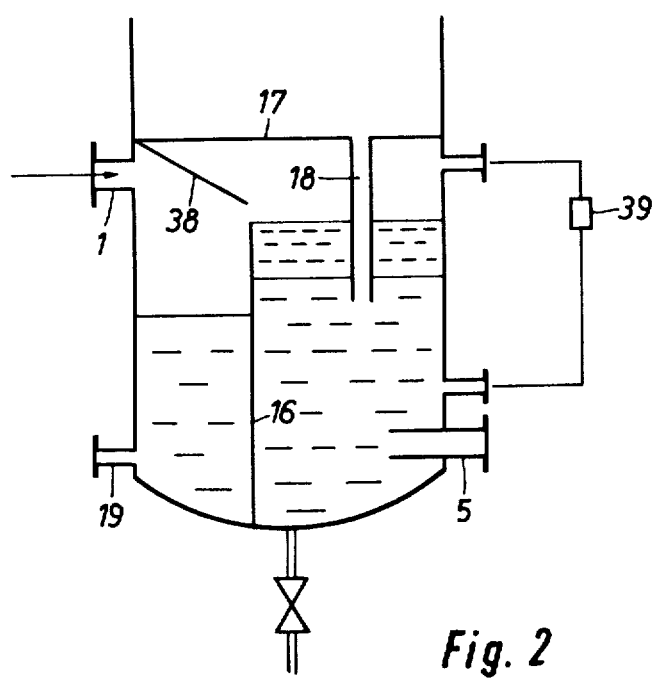
FIG. 2 is a schematic view of the sump of the scrubbing column provided with baffle and holdup means for removal of resin precursors before they are passed to the regenerating column.

Referring to FIG. 2, the sump of the scrubbing column 2 is designed so that the hydrocarbons condensing in the scrubbing column, which contain an especially large amount of resin precursors, can be separated prior to the regeneration from the scrubbing liquid as quantitatively as possible. For this purpose, there must be a sufficiently long holdup capacity in the sump, i.e., a sufficiently large space must be available to allow the phases to separate. By utilizing the sump of the scrubbing column for this purpose, separate expensive settlers outside of the scribbing column are eliminated. As a means for separating entrainment, a baffle 38 is disposed above the inlet point of the raw gas. In this way, it is possible to remove immediately from the gaseous stream any droplets or mists of hydrocarbon condensate not trapped by the separator positioned after the final compressor cooler, or such entrainment formed by slight cooling in the downstream conduits thereof.

The sump of the scrubbing column 2 is divided into two chambers by a vertical plate 16 welded to the column walls, the larger of the chambers having a transverse cross sectional area of about 70–90% of the transverse cross section of the column. The scrubbing liquid leaving the lowermost plate 17 or the lowermost packing layer via a collecting plate, is conducted together with the condensate of the cracking gas through the drain 18 into the larger chamber where the two liquid phases separate from each other due to the difference in their specific gravities. The level of the heavy aqueous layer is kept at a constant height by a level controller or an interface regulator 39; this height is predetermined so that the residence time of the scrubbing solution in the sump is sufficient to permit phase separation, generally about 10–30 minutes. During this time, the dispersed droplets of condensed cracking gas are separated substantially quantitatively from the scrubbing liquid. To facilitate phase separation, the drain pipe 18 is positioned in the larger chamber so that it terminates beneath the level of the aqueous layer. The partition 16 extends above the designed level of the interface by about 200 mm. The hydrocarbon condensate is collected above the interface and eventually overflows partition 16 into the small chamber where it is withdrawn continuously or discontinuously via conduit 19.

Figure 3:
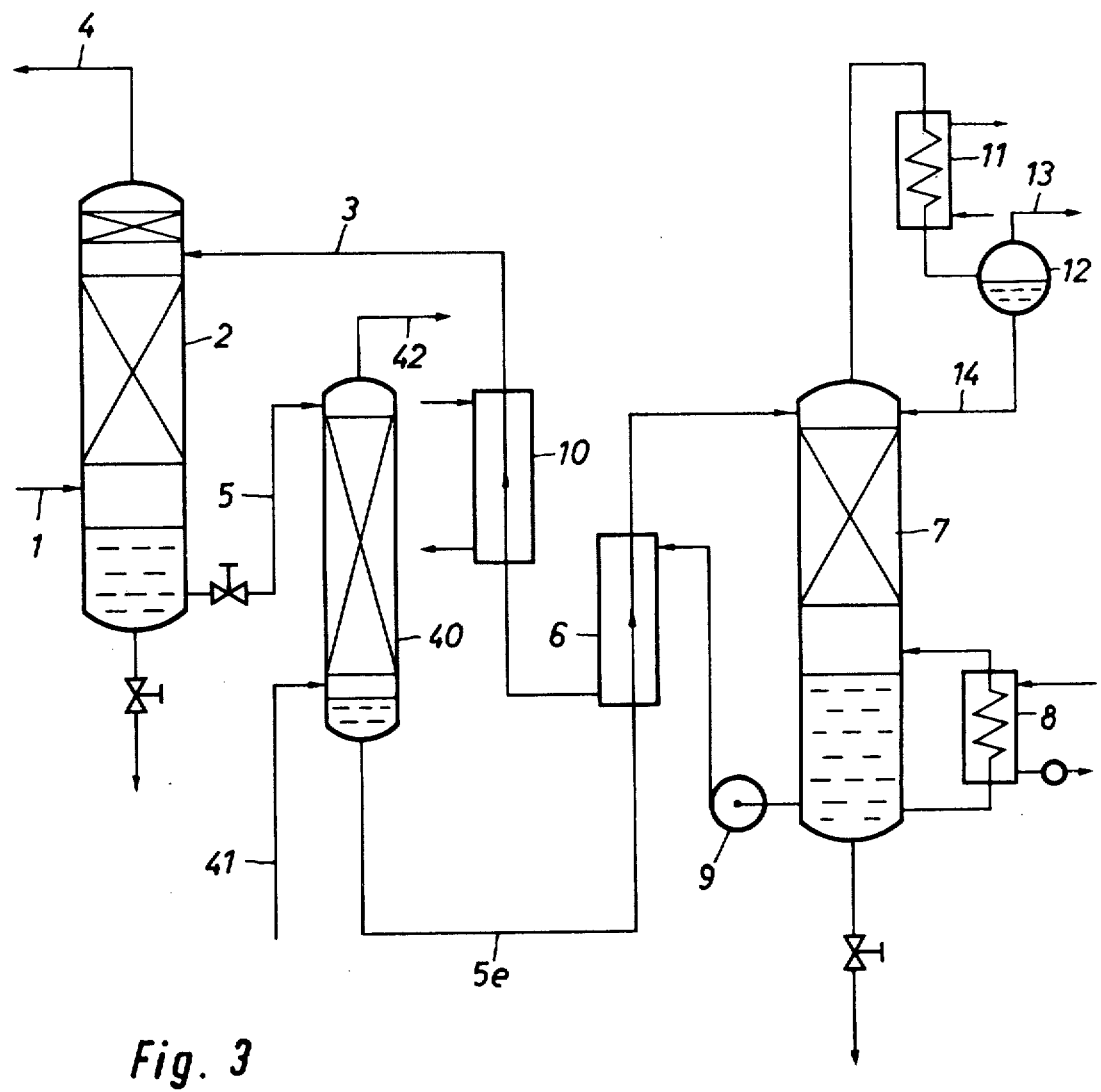
FIG. 3 is a schematic view of an embodiment of this invention wherein loaded scrubbing liquid is stripped of volatile resin precursors by countercurrent contact with a stripping gas before the loaded scrubbing liquid is heated in the thermal regenerator system.

Referring to FIG. 3, there is depicted the technique of stripping the scrubbing liquid of the more volatile resin precursors in a zone intermediate scrubbing column 2 and the heat exchanger 6. The loaded scrubbing liquor leaving the scribbing tower 2 via conduit 5 enters the head of the stripping column 40 and is brought into contact, during its downward passage with a gas fed through conduit 41 flowing in the opposite direction, for example methane, nitrogen, hydrogen, or residual gas. This stripping gas functions to remove the volatile resin precursors from the solution and discharges them via conduit 42 from the plant. The scrubbing liquid exits from the stripping column 40 by way of conduit 5e, is warmed in head exchanger 6, introduced to the head of the regenerating column 7, and further treated in the manner previously described.

Figure 4:
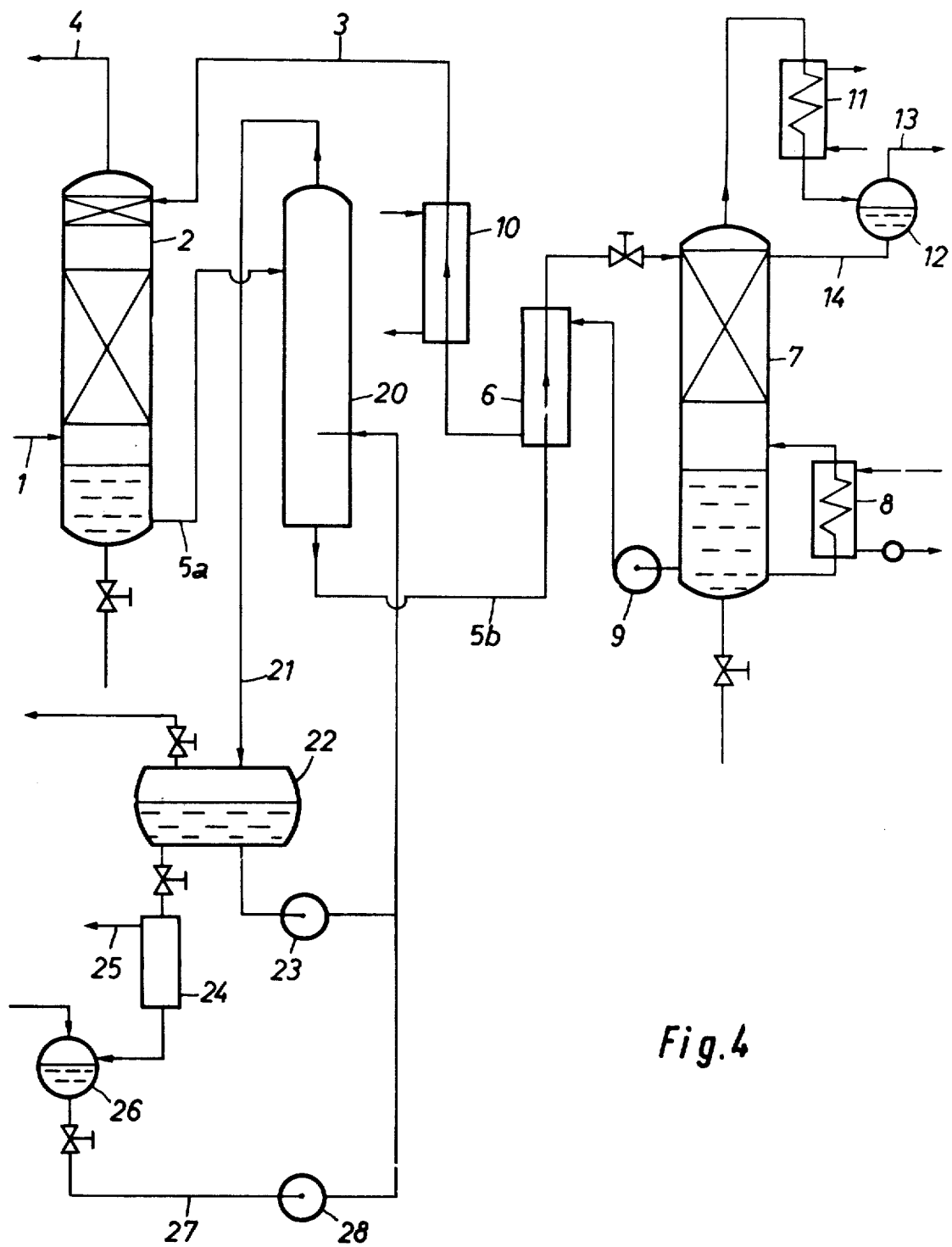
FIG. 4 is a schematic view of an embodiment of this invention wherein loaded scrubbing liquid, prior to regeneration, is subjected to solvent extraction to remove resin and resin precursors.

In FIG. 4, the scrubbing liquid, after exiting from the scrubbing column 2 and prior to being warmed in heat exchanger 6, is subjected to liquid-liquid extraction. The scrubbing liquid leaving the scrubbing tower 2 via conduit 5a enters the head of a liquid-liquid extraction column 20, and is countercurrently contacted with a solvent for resin precursors, said solvent being lighter than water and practically water-insoluble; the resultant solvent treated scrubbing liquid is removed from the extraction tower 20 through conduit 5b. The scrubbing solution, freed in this manner from resins and resin-forming substances, is now warmed in the heat exchanger 6 and introduced to the head of the regenerating column 7. The water-immiscible solvent is withdrawn from the head of the solvent extraction column 20 through conduit 21 and is collected in tank 22; with the aid of pump 23, this extraction agent is recycled to the lower section of column 20. From the collecting tank 22, part of the organic solvent loaded with the resins and resin-forming compounds is withdrawn and conducted to a recovery plant 24 wherein the pure solvent is recovered. A solution highly enriched in resins and resin-forming substances is withdrawn from the plant via conduit 25. The pure solvent passes into the storage container 26, and makeup solvent corresponding to the amount of liquid discharged through conduit 25, is withdrawn and recycled via conduit 27 and pump 28. In this process embodiment, the entering organic solvent does not come into contact with a rising gaseous or vapor stream, so that no solvent losses can occur by vaporization or entrainment in column 20. Accordingly, either low-boiling or high-boiling solvents can be employed. As organic solvents substantially immiscible with water, there are preferably employed aromatic hydrocarbons or mixtures thereof, fractions rich in aromatics, or chlorinated hydrocarbons, specific examples including, but not limited to benzene, toluene, xylene,

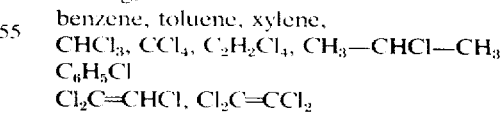

Figure 5:
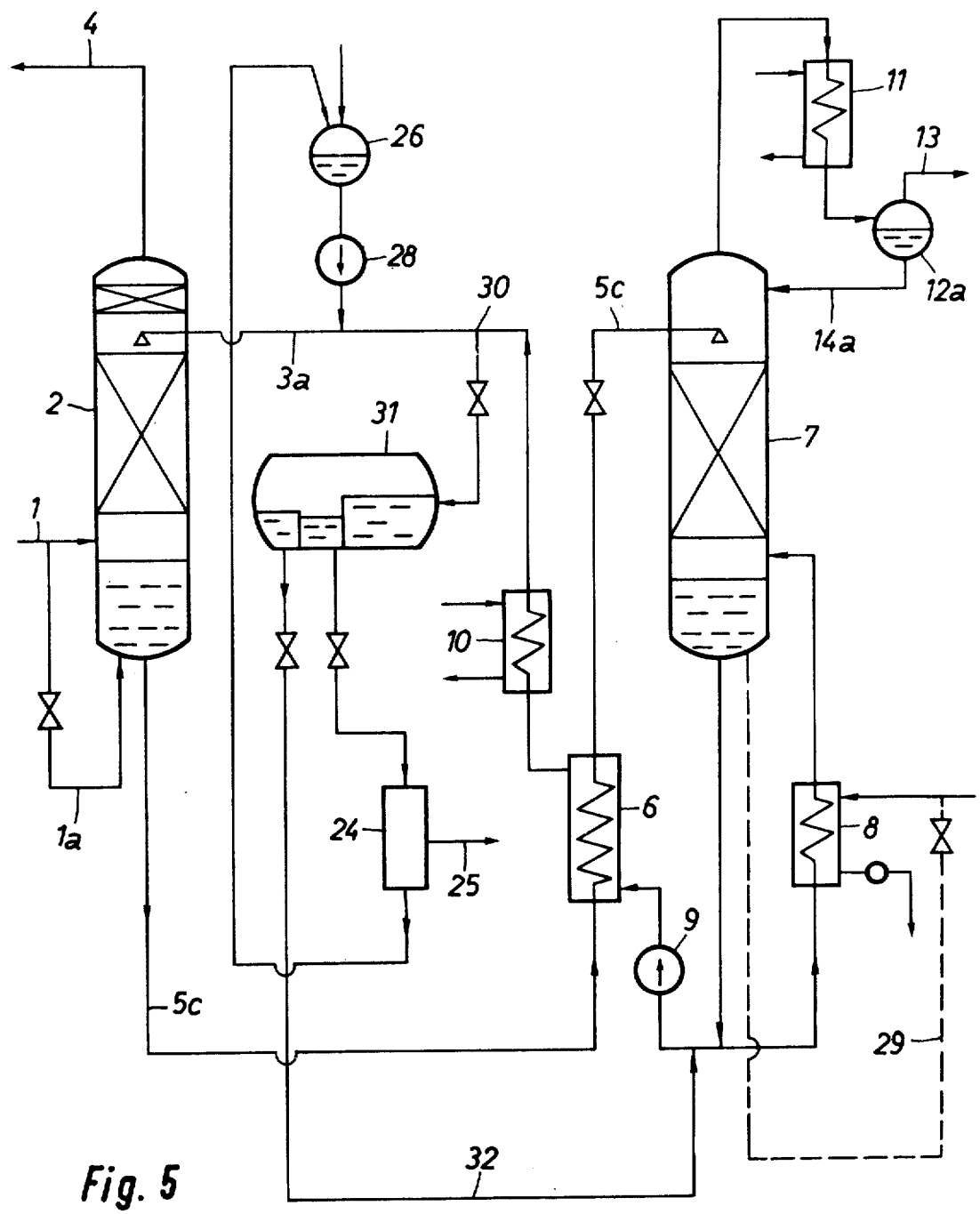
FIG. 5 is a schematic view of an embodiment of this invention wherein the scrubbing liquid in the scrubbing column is a dispersion of water-immiscible solvent in an aqueous solution of amine salt, the dispersion being maintained throughout the scrubber-regenerator cycle.

FIG. 5 depicts a process wherein the solvent for the resins and resin precursors is employed throughout the entire scrubbing and regenerating cycle. The raw gas enters the scrubbing column 2 through conduit 1, is brought into countercurrent contact with the scrubbing agent on mass transfer area means, (plates packing and the like) and leaves the column through conduit 4. The scrubbing agent is introduced in the form of a disperse mixture of an aqueous and non-aqueous phase, through conduit 3a, is enriched in acidic gaseous components, resin-precursors, and resins, and is collected in the sump of the column.

A separation of the two phases in the sump is advantageously prevented by introducing a small proportion of the raw gas into the sump of the column, as indicated by the conduit 1a branching off from conduit 1. The scrubbing agent, withdrawn through conduit 5c, is warmed in heat exchanger 6, introduced to the head of the regenerating column 7, and descends, countercurrently to rising solvent vapor and steam produced by the reboiler 8, into the sump. The separation of the phases in the sump of the regenerating column is prevented by introducing steam into the sump liquid via steam trace line 29. The regenerated scrubbing agent, consisting, as before, of a dispersion of an aqueous solution of an amino-acid salt and an organic solvent is conveyed, by means of pump 9, through the heat exchanger 6 and the water cooler 10 into the column 2. At 30, a partial stream of the dispersion is withdrawn and introduced into a separating vessel 31 wherein both phases are separated. The heavier aqueous phase passes back into the cycle via conduit 32; the non-aqueous phase is worked up into pure solvent in the solvent purification means 24; this purified solvent is fed to the storage tank 26. From tank 26, fresh solvent continuously is metered into the cycle by means of pump 28 so that the desired ratio of the two phases in the scrubbing agent is maintained. The portion of the organic solvent evaporating in the regenerating column 7 is condensed, together with the steam, in cooler 11 and recycled into the column via the separator 12a and the conduit 14a. The uncondensed acidic gases leave the plant via conduit 13.

To prevent the scrubbed raw gas and the acidic gases escaping during the regenerating step from entraining larger amounts of the organic solvent, less volatile solvents are preferably employed in this embodiment, e.g., perchloroethylene.

Figure 6:
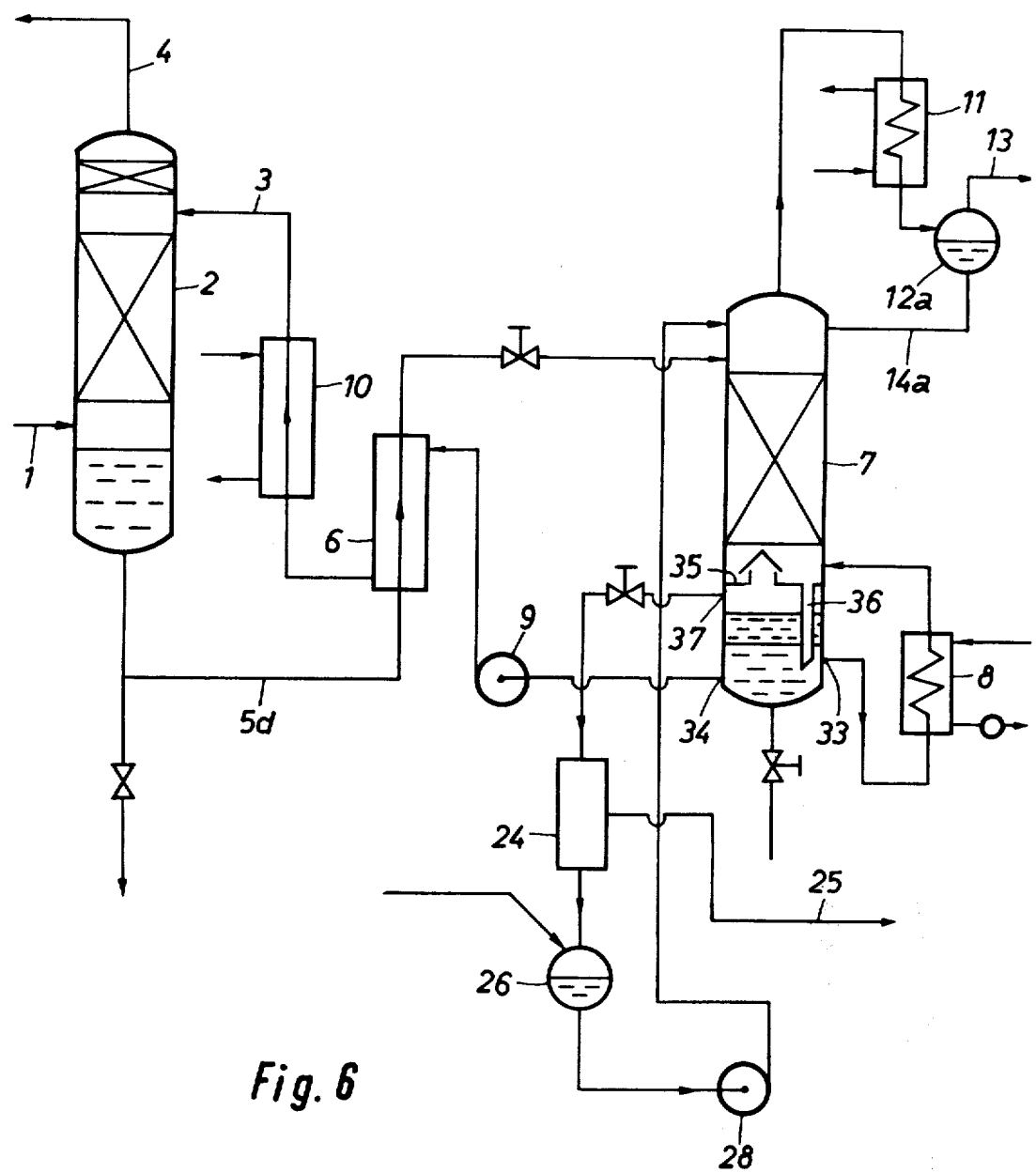
FIG. 6 is a schematic view of an embodiment of this invention wherein organic solvent is introduced at the head of the regenerating column and the bottom of the column is employed as a settler to separate the phases so that aqueous solution can be reboiled and passed to the column in the vapor phase. The organic solvent is freed of resins and resin precursors before being recycled to the column.

FIG. 6 shows a process scheme which differs from that of FIG. 5 insofar as the organic solvent is employed only in the heat exchanger and regenerating column associated therewith. Furthermore, the aqueous phase and the hydrocarbon phase are separated in the sump of the regenerating column instead of remaining in the dispersed condition.

Solvent which dissolves resins and resin precursors and which is substantially immiscible with water is introduced continuously to the head of the regenerating column and flows down, together with the condensate coming from the separator 12a, and the heated loaded scrubbing liquid in 5d countercurrently to the rising vapors produced in the reboiler 8, into the sump; the drain pipe 36 of the lowermost plate 35 or of the collecting plate terminates beneath the level of the aqueous layer. In this manner, three liquid zones are formed in the sump: The aqueous phase is disposed in the bottom-most part of the column, the layer disposed thereover consists of a dispersion of the solvent in the aqueous phase; and the uppermost layer represents solvent free of dispersed aqueous solution. A partial stream of the latter phase, enriched in resins, is withdrawn at 37, freed of the impurities in the solvent purification means 24, and fed into the storage tank 26, from where fresh solvent is pumped to the head of the regenerating column by means of pump 28. The regenerated aqueous absorbent is withdrawn at 34 and passes via pump 9, heat exchanger 6, and water cooler 10, to the head of the scrubbing column 2. Steam is produced in the reboiler 8 from aqueous solution withdrawn at 33. The rising vapors desorb $CO_2$ and/or $H_2S$ from the downwardly trickling scrubbing liquid, and are condensed in the water cooler 11, the uncondensed acidic gases leaving the plant via conduit 13. The condensate is a dispersed mixture of water and solvent, which mixture is recycled via the phase separator 12a into the regenerating column 7 and prevents the deposition of resins in all parts of the column and boiler. The temperature of the cooler 11 and the volatility of the solvent are to be related to each other in such a manner that only minor amounts of solvent are discharged with the acidic components.

SPECIFIC EXAMPLE

The gas mixture to be scrubbed has the following composition:

| 11.7 | Vol% | $H_2$ | 11.9 | Vol% | $C_3H_6$ |
|------|------|-------|------|------|----------|
| 30.9 | " | $CH_4$ | 4.5 | " | $C_4H_x$ |
| 4.4 | " | $C_2H_6$ | 2.1 | " | $C_4H_6$ |
| 29.7 | " | $C_2H_4$ | 0.1 | " | $CO_2$ and $H_2S$ |
| 0.6 | " | $C_2H_2$ | 3.8 | " | $C_{5+}$ |
| 0.3 | " | $C_3H_8$ | | | |

The content of $H_2S$ is 735 ppm, the content of $CO_2$ 265 ppm; thee pressure is 32.8 atm, the temperature 35°C. Under these conditions 1000 Nm³/h of the gas mixture are scrubbed in column 2 of FIG. 4 with 77.5 l of an aqueous solution of about 40 weight-% of potassium-N-methyl-α-aminopropionate (density of the solution 1.17). The scrubbed gas mixture escaping through conduit 4 contains 45.6 ppm $H_2S$ and 4.3 ppm $CO_2$; these latter impurities are removed in a following caustic wash with 8 % aqueous NaOH-solution (not shown).

The solution containing $CO_2$, $H_2S$ and resin precursors leaves the scrubbing column 5 through conduit 5a nd enters the liquid-liquid extraction column 20, where it is contacted with 3 l partially hydrogenated crack-benzine, which is rich in aromatic compounds. (The crack-benzine has been separated from the cracking gas before compressing the latter to the pressure of 32.8 at). The benzine-solvent extracts the resin precursors out of the aqueous alealine solution, leaves the column 20 through conduit 21 and enters the settling tank 22, from where it is recycled to the column 20 by pump 23. Part of the solvent is withdrawn and is freed from resins and resin precursors by distillation in 24.

If the resin precursors cannot be removed to the desired extent by the liquid-liquid-extraction only, in addition thereto the gas to be scrubbed is cooled to 33°C; now because of such cooling, in the scrubbing column 2 there is formed 5 l of a condensate of preferably $C_{5+}$ hydrocarbons. This condensate - as well as the aqueous alkaline solution - comes into counter-current contact with the gas to be scrubbed and is collected in the sump of the column 2 as a separate layer. The sump of the column 2 in this case is designed as shown in FIG. 2. The hydrocarbon layer is removed by conduit 19; the aqueous solution is fed by conduit 5 into the liquid-liquid extraction column.

A further measure is to apply the regeneration process according to FIG. 1; this means that the liquid in conduit 5b of FIG. 4 is additionally treated in the same manner as the liquid in conduit 5 of FIG. 1: It is passed via heat exchanger 6 to the head of the regenerating column 7. In the reboiler 8 there are produced 8.7 kg stripping steam which rises together with $CO_2$, $H_2S$ and volaile resin precursors. Steam and resin precursors are condensed in heat exchanger 11, separated from $H_2S$ and $CO_2$ at 12 and discarded by conduit 14.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process comprising i) scrubbing a cracking gas containing a) resin precursors selected from the group consisting of dienes, higher acetylenes, unsaturated polycyclic or heterocyclic compounds, and polymerizable or condensible sulphur-containing compounds; and b) at least one member selected from the group consisting of carbon dioxide and hydrogen sulfide with c) a thermally regenerable aqueous alkaline scrubbing solution to absorb primarily said carbon dioxide and hydrogen sulfide, and ii) thermally regenerating the resultant loaded aqueous solution, the improvement which comprises:

passing a liquid dispersion of a substantially water-immiscible organic solvent and an aqueous solution of potassium carbonate, alkanolamine or an aminocarboxylic, aminosulfonic or aminocarbonic acid salt through scrubbing and regenerating columns to separate and remove the resin precursors from the loaded aqueous solution during thermal regeneration of said loaded aqueous solution by preferential extraction of said resin precursors into said organic solvent.

2. A process according to claim 1, wherein said cracking gas contains a total of less than 1% by volume of combined carbon dioxide and hydrogen sulfide.

3. A process according to claim 1, wherein the volume ratio of aqueous to non-aqueous phases during said solvent extraction is from about 50 : 1 to 10 : 1.

4. A process according to claim 1, wherein the mixture of said aqueous solution and said organic solvent is maintained in the dispersed state by introducing a partial stream of raw cracking gas into the sump liquid of said absorption column beneath the liquid level thereof.

5. A process according to claim 1, wherein the mixture of said aqueous solution and said organic solvent is maintained in the dispersed state by blowing steam into the sump liquid of said regenerating column.

6. A process according to claim 1, further comprising separating the loaded organic solvent and aqueous solution by phase separation.

7. A process according to claim 6, wherein said phase separation is conducted in the sump of said regenerating column.

8. A process according to claim 1, wherein the cracking gas contains a total of less than 1% by volume of combined carbon dioxide and hydrogen sulfide, and wherein the volume ratio of aqueous to non-aqueous phases during the solvent extraction is from about 50:1 to 10:1, further comprising separating the loaded organic solvent and aqueous solution by phase separation in the sump of said regenerating column.

9. A process according to claim 1, wherein the aqueous solution is one of an aminocarboxylic, aminosulfonic or aminocarbonic acid salt.

* * * * *